US009280271B2

United States Patent
Hoog et al.

(10) Patent No.: US 9,280,271 B2
(45) Date of Patent: Mar. 8, 2016

(54) DEVICE AND METHOD FOR INTERACTIVE PROGRAMMING OF A BEVERAGE BREWING APPARATUS

(76) Inventors: Klaus D. Hoog, Oriental, NC (US); Eric P. Hoog, Oriental, NC (US); Rodney W. Queen, Salisbury, NC (US)

( * ) Notice: Subject to any disclaimer, the term of this patent is extended or adjusted under 35 U.S.C. 154(b) by 127 days.

(21) Appl. No.: 13/525,830

(22) Filed: Jun. 18, 2012

(65) Prior Publication Data

US 2013/0337119 A1    Dec. 19, 2013

(51) Int. Cl.
| | |
|---|---|
| *A47J 31/06* | (2006.01) |
| *A47J 31/00* | (2006.01) |
| *A47J 31/40* | (2006.01) |
| *G06F 3/0484* | (2013.01) |
| *G06F 3/0488* | (2013.01) |
| *A47J 31/02* | (2006.01) |
| *A47J 31/52* | (2006.01) |

(52) U.S. Cl.
CPC .......... *G06F 3/04847* (2013.01); *G06F 3/0488* (2013.01); *A47J 31/02* (2013.01); *A47J 31/52* (2013.01)

(58) Field of Classification Search
CPC ......... A47J 31/52; A47J 31/02; A47J 31/401; A47J 36/20; A47J 27/62; A47J 45/068; A47G 19/14; G06F 3/0488; G06F 3/016; G09G 3/3648; F24C 7/082; H05B 3/746
USPC ........ 99/285, 280, 288, 323.3, 403, 325, 342; 345/173, 87, 156; 219/506, 445.1
See application file for complete search history.

(56) References Cited

U.S. PATENT DOCUMENTS

| | | | | |
|---|---|---|---|---|
| 6,752,069 | B1 * | 6/2004 | Burke et al. | 99/280 |
| 7,146,253 | B2 * | 12/2006 | Hoog et al. | 700/276 |
| 8,171,843 | B1 * | 5/2012 | Heffington | 99/282 |
| 2006/0188620 | A1 * | 8/2006 | Gutwein et al. | 426/433 |
| 2006/0278092 | A1 * | 12/2006 | Lyall | 99/279 |
| 2008/0183330 | A1 * | 7/2008 | Monn | 700/239 |
| 2009/0293733 | A1 * | 12/2009 | Martin et al. | 99/280 |
| 2010/0268792 | A1 * | 10/2010 | Butler et al. | 709/217 |

FOREIGN PATENT DOCUMENTS

KR      2002-0005558 A  *  1/2002

* cited by examiner

*Primary Examiner* — Dana Ross
*Assistant Examiner* — Hemant Mathew
(74) *Attorney, Agent, or Firm* — Ward and Smith, P.A.; Ryan K. Simmons (57) ABSTRACT

An interactive programmable beverage brewing apparatus providing audible setup and control instructions for ease of use is presented. The beverage brewing apparatus includes the ability to audibly instruct a user in the steps for setup of the beverage flavor characteristics when a beverage is to be brewed, and provide audible instructions in the use of the machine during normal brewing operations. The beverage brewing apparatus also provides a visual display to present phrases and icons to assist the user in performing setup and brew operations in conjunction with the audible instructions. Visual phrases and icons presented to a user also provide instruction in how to setup and control timers and how to turn on and off one or more warming plates to keep a beverage hot during and after brewing.

28 Claims, 5 Drawing Sheets

DEVICE AND METHOD FOR INTERACTIVE PROGRAMMING OF A BEVERAGE BREWING APPARATUS

1 FIELD OF THE INVENTION

The present invention generally relates to a device that may be used to automatically brew beverages such as coffee and tea. In particular, the present invention is directed to a device that can brew coffee or tea by adjusting the proper brew time and water temperature for each of a plurality of coffees and teas.

2 BACKGROUND OF THE INVENTION

As the popularity of coffee and tea grows, there is a demand for greater variety in these beverages. Some of the more common varieties of coffee are Colombian, French Roast, Kona, and Costa Rican. Some of the more common tea varieties are Black, Oolong, Green, and White. Preferred water temperature for coffee varies from about 195° F. to about 205° F. Preferred water temperatures for the various types of tea can vary from about 140° F. for high quality green tea to about 208° F. for black tea.

The proper brew time of each of the various coffees is mainly determined by the grind size. Finely ground coffee is brewed quickly, while coarse ground coffees must be brewed slowly to allow water to penetrate the larger particles. Brew time can also be lengthened or shortened to increase or decrease the strength of either coffee or tea, according to taste.

To accommodate all these variations an automatic, programmable beverage brewing apparatus is required. There are several programmable beverage brewing apparatuses now available in the market. To operate these units, a user may select different water temperatures and brewing times for different types of beverages and program them into the brewer. However, programming such machines can be challenging when used by people, who are not very familiar with electronic appliances and with programming procedures/systems. It can take as many as 25 steps to program one of these units.

The displays used in many programmable beverage brewing apparatuses are usually small and very limited, and therefore are not interactive with the user. To reduce cost some devices may use fewer keys, but a reduced number of keys can also introduce a confusing number of key combinations to memorize. Therefore, even though they may not be completely lacking in general knowledge of programming electronic devices, users are often obliged to consult the related instruction booklet (which may not be readily available, and when it is available is not always completely understandable), and the potential of the programming device can almost never be entirely exploited.

Therefore, there is a need for a programmable beverage brewer that is easily programmable by a user having little to no knowledge or experience in programming such device.

3 BRIEF DESCRIPTION OF THE INVENTION

The present invention provides a device and method for interactive programming of a beverage brewing apparatus that verbally provides step-by-step instructions helping a user to manage programming that changes the flavor characteristics of the brewed beverage, such as programming temperature and brewing time parameters, for different types of beverages in one or more languages.

Prior to use, the automatic, programmable beverage brewing apparatus preferably is setup to provide preset parameter values for the brewing of one or more beverages. A user first initiates setup mode, for example, by pressing "OK" and "Stop" buttons at the same time to enter the setup mode. Once in setup mode, a user may press the "coffee" button and the beverage brewing apparatus audibly instructs the user to "Press the Up or Down keys to set temperature, when finished, press OK" or similar audible instruction. After the temperature is set and "OK" is pressed, the screen displays a bar scale. The beverage brewing apparatus audibly instructs the user to "Press the Up or Down keys to set strength, when finished, press OK" or similar audible instruction. The screen then proceeds in similar fashion to enter the preset value for the desired coffee grind.

All brew modes are preferably set up substantially the same way. On pressing a button associated with a "Top" warmer, for example, the screen displays the top timer and the beverage brewing apparatus audibly instructs the user to "Press the Up or Down keys to set Top Warmer timer, when finished, press OK" or similar audible instruction. The setup of the Base warmer is accomplished the same way and, after the base timer has been set, the beverage brewing apparatus may audibly add instructs "Press the Up or Down keys to set flow, when finished, press OK" or similar audible instruction. The flow function allows small adjustments in the amount of water that flows into the carafe in case the carafe over or under fills.

The automatic, programmable beverage brewing apparatus herein described, preferably in one embodiment has a default setup for two coffee options and two tea options for automatic brewing. There are many more coffee and tea options available in the marketplace. A user may download any number of additional coffee and tea options by accessing the Internet through Bluetooth and/or WiFi technologies communication technology. Adding either technology, or other suitable communication technology, to permit the beverage brewing apparatus to access the Internet gives the user access to a large number of options and information for coffee and tea brewing.

A user may specify a beverage for brewing by activating the beverage brewing apparatus by first turning power on to the apparatus and initiating a beverage brewing process within a microprocessor installed within the beverage brewing apparatus. The beverage brewing apparatus will record the user responses to setup instructions presented as audible, vocal instructions from a speech circuit associated with the beverage brewing apparatus and begin brewing a selected beverage in accordance with the recorded user responses. The beverage brewing apparatus may also activate one or more warmer plates and warmer plate timers to maintain the brewed beverage at the user directed temperature for the duration input by the user.

The user will provide setup instructions by first entering the setup mode through the selection of a particular set of control buttons by the user. The beverage brewing apparatus will record the user responses to set up temperature, strength, and grind values as desired by the user in response to audible, vocal instructions presented to the user during setup operations. The apparatus may then store the recorded user responses in a storage element associated with the microprocessor for use in a brewing action.

In addition to the setup of brew options, the user may set up parameters for the user selected warmer plates. The beverage brewing apparatus will present the user with a visual timer icon on a visual display element of the beverage brewing apparatus for each selected warmer plate. The apparatus may then record the user selection of timer duration for each warmer plate. The apparatus may then provide the user with an audible instruction for entering a set flow fill value and record the user selection of a set flow fill value to adjust the set flow for a carafe associated with the beverage brewing apparatus.

5 DETAILED DESCRIPTION OF THE INVENTION

The present invention can be used to interactively program a beverage brewing apparatus and verbally provide step by step instructions to help a user to manage temperature, brewing time parameters, strength of beverage, grind parameters, and/or warming timers. The audible instructions may be provided in one or more languages. Additionally, through a connection to the Internet, through, for example, a WiFi and/or Bluetooth connection, or other communication technology, the beverage brewing apparatus provides the user with the ability to download a number of additional preset options for various beverage brews, and providing audible instructions and/or information (such as where the coffee or tea is grown, flavor characteristics, history, etc.) to a user when setting options for a downloaded beverage brew.

Figure 1:
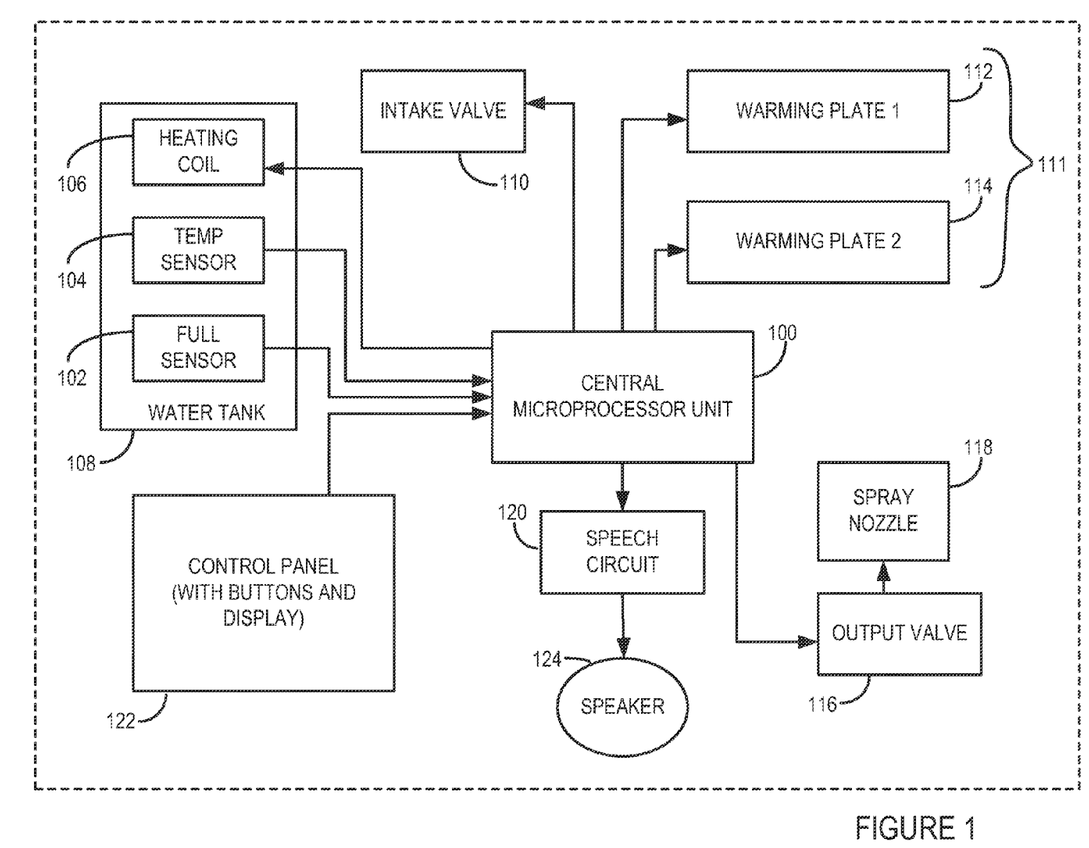
FIG. 1 illustrates a block diagram of an interconnection of different components of an automatic, programmable beverage brewing apparatus consistent with certain embodiments of the invention.

FIG. 1 presents an exemplary block diagram of the interconnection of the different components of the automatic, programmable beverage brewing apparatus. The beverage brewing apparatus derives the ability to automate brewing functions and permit the programming of brewing characteristics and warming preset values through an integral central processing unit 100 (CPU). The CPU 100 is a CPU 100 device that is communicatively coupled to all display and active components of the beverage brewing apparatus to allow input and output signals to and from each component. The CPU 100 comprises a programmable logic unit and an internal memory in which preset parameters input by a user are stored and communicated to each component as required during brewing actions.

In this exemplary embodiment the CPU 100 is communicatively connected to a full sensor 102, a temperature sensor 104, and a heating coil unit 106, each of which is installed within a water tank 108 component. The full sensor 102 detects the level of water in the water tank and transmits a signal indicating the water level condition to the CPU 100 upon request from the CPU 100 during startup and operation actions. The temperature sensor 104 is active to determine the temperature of the water in the water tank 108. The temperature sensor 104 reports the temperature of the water in the water tank 108 when sampled by the CPU 100. The CPU 100 will check the temperature of the water in the water tank 108 continuously in the operation cycle of the beverage brewing apparatus to determine when the water temperature does not meet the required temperature for brewing operations. The heating coil 106, also installed within the water tank 108, is operative to raise the temperature of the water in the water tank 108 when activated by a signal from the CPU 100 in response to a report of a water temperature below the required temperature from the temperature sensor 104. The CPU 100 is also communicatively connected to an intake valve 110 that is operative to regulate the flow of water into the water tank 108. In response to a report of a water low condition in the water tank 108 from the full sensor 102, the CPU 100 will send an activation signal to the intake valve 110 to add water to the water tank 108 until it is full. The intake valve 110 will also be activated by the CPU 100 during brewing operations to add water to the water tank 108 as required by the brewing operation.

In the exemplary embodiment the CPU 100 controls the operation of warming plates 111, for example, warming plate 1 112 and warming plate 2 114, as requested by a user of the system. The CPU 100 is also communicatively connected to an output valve 116 to regulate the flow of water flowing out of the water tank 108. The output valve 116 is fluidly connected to a spray nozzle 118 that is positioned to spray water into a carafe (not shown) during brewing operations. The CPU 100 is also connected to alerting and communication components that include a speech circuit 120 and a visual display panel 122 such as a liquid crystal diode (LCD) or other display device that is compact and programmable to display visual icons that convey information of interest to the user, and may further include a touch screen integrated with the display panel 122. Further included in the display and control panel is an audio system composed of the speech circuit 120 and a speaker 124 that provides for audio instruction during the programming and setup of the beverage brewing apparatus. The speech circuit 120 is capable of generating and/or storing vocal directions and informational speech that is output to the user through the use of the speaker 124 under the control of the CPU 100.

Figure 2:
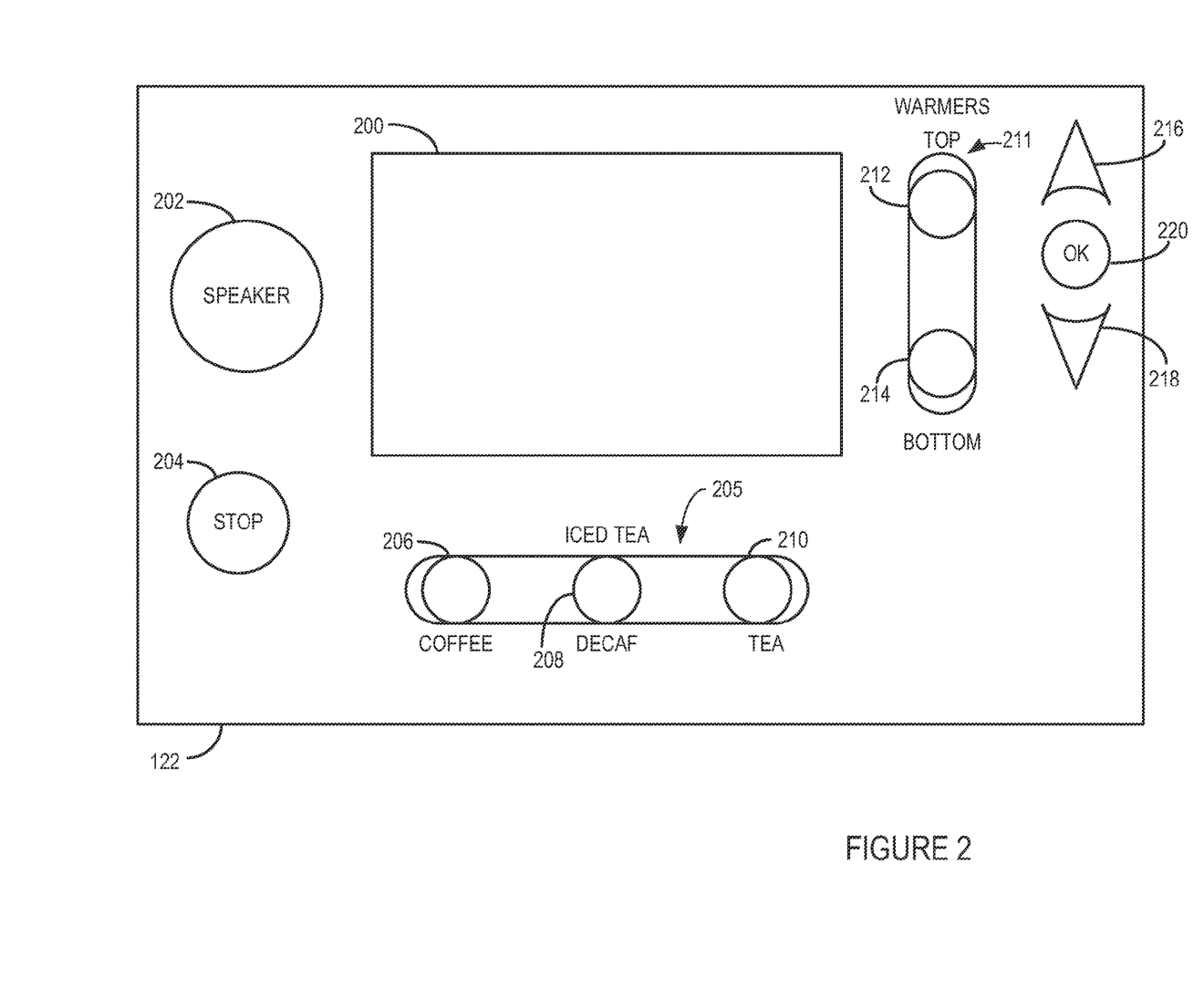
FIG. 2 illustrates component view of a control panel and display of the automatic, programmable beverage brewing apparatus consistent with certain embodiments of the invention.

FIG. 2 presents a component view of the control panel 122 and display 200 of the automatic, programmable beverage brewing apparatus consistent with certain embodiments of the invention. In an exemplary embodiment, the control panel 122 includes a plurality of trigger components that upon activation provide for programming and activating the beverage brewing apparatus functions. In this embodiment the central component of the control panel 122 is the display panel 200. The display panel 200 is accompanied by a number of trigger components. In this non-limiting example presented in the figure, the display panel 200 is surrounded by a number of components, including input components, such as button components or touch screen input components, that transmit control signals when acted on by a user, and an audio component. The audio component is speaker 124 that audibly provides speech directives and information to the user during setup and programming operations. For the sake of simplicity the plurality of trigger components, e.g., input components, will be referred to hear throughout as a button or buttons, however it is contemplated that the trigger components may be in the form of buttons, switches, dials, a touch screen, or any other suitable input component. A "Stop" button 204 provides an escape means from any action that the beverage brewing apparatus is performing. In operation, the "Stop" button 204 acts much like an ESC key on a personal computer; submitting a high-priority interrupt signal to the CPU 100 to interrupt any current activity and placing the beverage brewing apparatus CPU 100 in a stopped state to await further instructions. The "Stop" button 204 is the means for the user to pause any current brewing action to provide the user an opportunity to start a different action or continue with the current brewing action if so desired. The control panel 122 also has one or more brew buttons 205 that are used to indicate what beverage a user wishes to brew. In this exemplary embodiment, the brew buttons 205 indicate to the user the selections of "coffee" button 206, "Decaf/Iced Tea" button 208, and "Tea" button 210. Additionally, the control panel 122 provides warmer buttons 211 to turn on and off the warmers 111 with, for example, "Top" button 212 and "Bottom" button 214 for "Top" "Bottom" warmers 112 and 114 respectively. Pressing one of these buttons sends an indication to the CPU 100 that the warmer 111 functionality associated with that button should be turned on or off. The buttons function as simple toggle buttons, changing the action to the opposite state with each depression of the button. In this exemplary embodiment, if the top warmer 112 is currently active, depressing the "Top" button 212 will turn off the top warmer 112. In like fashion, if the top warmer 112 is currently inactive, depressing the "Top" button 212 will activate the top warmer 112, both turning the warmer 112 on and allowing the user to set a time associated with the top warmer 112. Further, control panel 122 may include an "UP" button 216, a "DOWN" button 218, and an "OK" button 220. The "UP" button 216 and the "DOWN" button 218 can adjust any number setting up or down, such as adjusting temperatures, strength, grind, or timers. The "OK" button 220 functions in a similar fashion to the RETURN key on a personal computer, sending signals to the CPU 100 indicating the end of a sequence of actions such as multiple depressions of the "UP" button 216 when setting a temperature or other function that may accept multiple button depressions as input. As these buttons are activated, the resulting activation can be verbally announced and verbal announcements as to instructions for user action can be provided to the user through the activation of the speaker 124.

In this exemplary embodiment, the display panel 200 preferably displays the water temperature and the present mode of the brewing apparatus. The display panel 200 may display setup options when in setup mode and the brewing operation active when the brewing apparatus is in brewing mode. The display panel 200 is operative to display many features of the present invention including, but not limited to, phrases and icons that represent "Heating Water", "Brewing", "Standby", "Setup", "Flow", "Coffee", "Decaf", "Iced Tea", "Tea", and/or other features. Additionally, the display panel 200 will display a visual display icon, such as bar scale (e.g., an eight position bar scale), to show strength or grind scale when in setup mode, and two countdown timers that are operative to shut off the warmer plates after a preset time period input by the user.

This embodiment, to accommodate the audio features of the system, preferably provides speaker 124 with a grid protecting the speaker component while providing substantial free space for sound to travel through the grid. The speaker 124, having an adjustable volume, is preferably mounted to project sound into the area of the room directly in front of the beverage brewing apparatus. An amplifier drives the speaker 124 as is well known in the art. Depressing any of the buttons on the control panel 122 initiates the applicable audio message through the speaker 124 representative of the action of the selected button, whether in startup mode or in brewing mode.

The audio system further comprises speech circuit 120 to enunciate the desired action or provide instructions of programming. Necessary audible messages are recorded and imported to the speech circuit non-volatile memory prior to sale of the beverage brewing apparatus to an individual. Verbal announcements can be stored in a conventional serial or parallel memory chip, or directly in the CPU 100 memory. Alternatively, the CPU 100 includes applicable algorithms that generate voice-like words in response to specific actions by the user. Any commercially available voice chip or addressable voice chip that provides the above features may be used.

Figure 3:
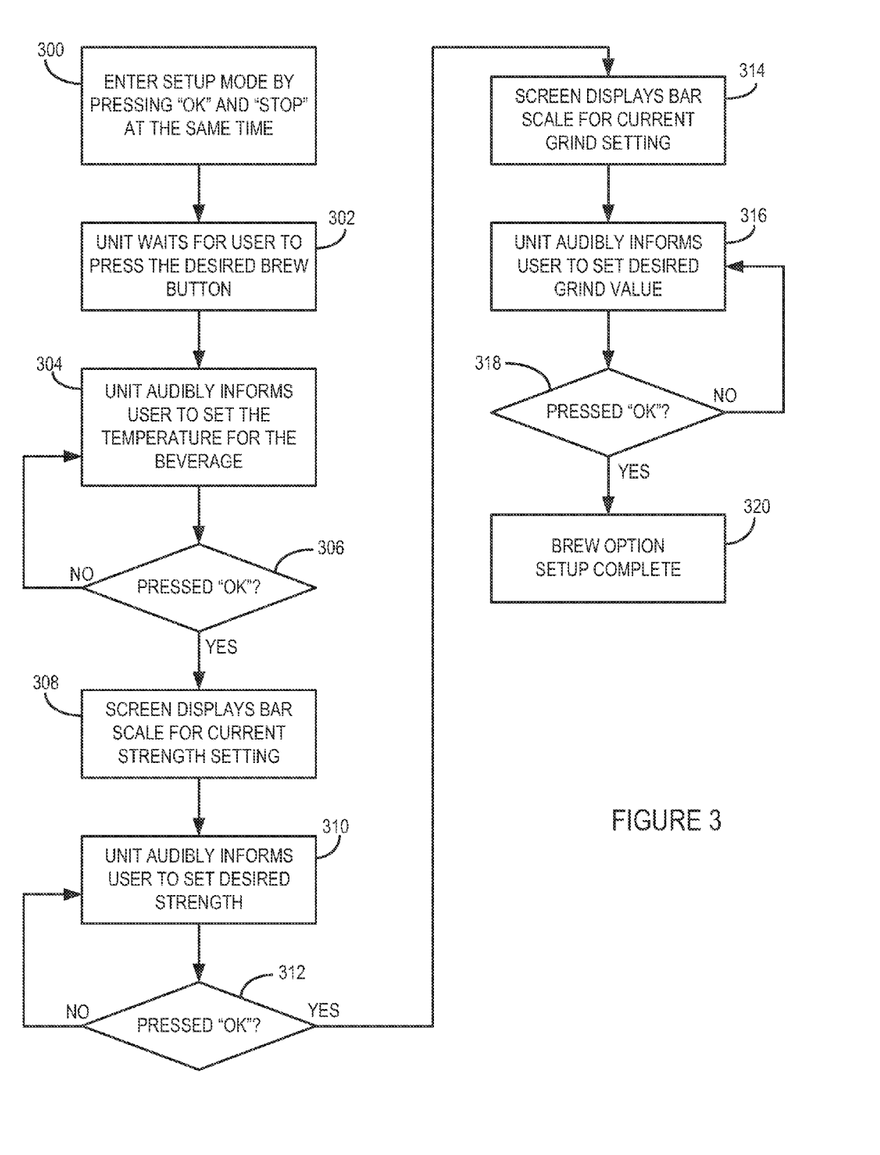
FIG. 3 illustrates a flow chart for a brew option setup operation for the automatic, programmable beverage brewing apparatus consistent with certain embodiments of the invention.

FIG. 3 presents a flow chart for a brew option setup operation for the brewing apparatus. The flow chart presented in FIG. 3 provides and exemplary setup operation where the user interacts with the beverage brewing apparatus in a programmable setup mode. As a part of the programming operation, the user will be provided with voice prompts audible through the speaker 124 giving the user step by step instructions to help manage the setup process complexity by reducing the need for a user to refer to a programming manual or memorize an inordinate number of programming steps. The audible programming instructions may be provided to a user in one or more languages.

In this exemplary embodiment, at 300 the user will initiate setup mode by, for example, pressing the "OK" and "STOP" buttons 220 and 204 respectively, on the control panel at the same time. The CPU 100 captures the concurrent signals from these two buttons and places the brewing apparatus in the programmable setup mode. Once setup mode has been initiated, at 302 the CPU 100 awaits a signal from the user indicating a brew selection. The user presses a desired brew button 205 such as, in a non-limiting example, the "Coffee" button 206. In other non-limiting examples, the user could have selected "Decaf" or "Tea" buttons 208 and 210 respectively, and the beverage brewing apparatus would accept each signal as an indication of the beverage to be brewed. Additionally, through the use of a Bluetooth or Wifi interconnection to the Internet, other desired brew options and/or beverage information (such as where the coffee or tea is grown, flavor characteristics, history, etc.) can be downloaded to the CPU 100. Upon downloading such brew options, the CPU 100 will assign a downloaded brew option to a brew button 205, providing a different brew option for the indicated brew button 205. In an alternative embodiment, the CPU 100 could store downloaded brew options in electronic memory associated with the CPU 100 and, upon selection of a brew button 205, could provide the user with the ability to choose one or more brew options from a list displayed on the display panel 200. In this alternative embodiment, the CPU 100 could also activate the speech circuit 120 and speaker 124 to announce to the user that they may use the "UP" and "DOWN" buttons 216 and/or 218 respectively, to select a brew option from the list displayed on the display panel 200.

In the first exemplary embodiment, upon selection of a brew option by the user at 304 the CPU 100 activates the speech circuit 120 and the speaker 124 to present an audible instruction to the user. The audible instruction informs the user to "Press the UP or Down keys to set temperature, when finished, press OK" or a similar variation thereof. This instruction provided to the user removes any guesswork from the user's actions and provides direction for the next step in the brewing process for the selected brew option. At 306, the CPU 100 enters a wait state to await the signal from the "OK" button 220 indicating that the user has finished setting the temperature to their liking and has indicated acceptance of the temperature setting. At 308, the user has depressed the "OK" button 220 to end the wait state and the CPU 100 presents a bar scale icon on the display panel. The bar scale indicates the current strength setting that has been stored in the CPU 100 for that particular brew option. If no strength setting has been input prior to the current action, the current strength setting will indicate a zero by not changing the color or fill pattern for any of the elements in the bar scale. At 310, the CPU 100 activates the speech circuit 120 to audibly inform the user to "Press the UP or Down keys to set strength, when finished, press OK" or a similar variation thereof. Again, the CPU 100 enters a wait state at 312 to await the signal from the "OK" button 220 indicating that the user has used the Up and Down keys 216 and/or 218 respectively, to set the strength to their liking. The user will see one or more, of the elements of the bar scale change color or fill pattern to indicate the user's desired selection for the strength of the brew, where zero of the bar scale elements being filled indicates a very weak brew and all the bar scale elements being filled indicates the strongest brew that the brewing apparatus is capable of producing. At 314, the user has depressed the "OK" button 220 to end the wait state indicating entry of desired brew strength for this brew operation. At 316, the CPU 100 accepts the user's signal and presents the user an additional bar scale icon on the display panel 200. This bar scale icon indicates the grind setting for the current brew operation. If no grind setting has been input prior to the current action, the current grind setting will indicate a zero in the same manner as previously described for the strength setting bar scale icon. Also at 316, the CPU 100 activates the speech circuit 120 to audibly inform the user to "Press the UP or Down keys to set grind, when finished, press OK" or a similar variation thereof. Again, the CPU 100 enters a wait state at 318 to await the signal from the "OK" button 220 indicating that the user has used the Up and Down keys 216 and/or 218 respectively, to set the grind to their liking. At 320, the user has depressed the "OK" button 220 to indicate the completion of the grind selection and ends the wait state for the CPU 100. The parameters for the setup of the brew operation being complete, the CPU 100 terminates the brew option setup and provides access to any remaining setup functions that may be desired by the user.

Figure 4:
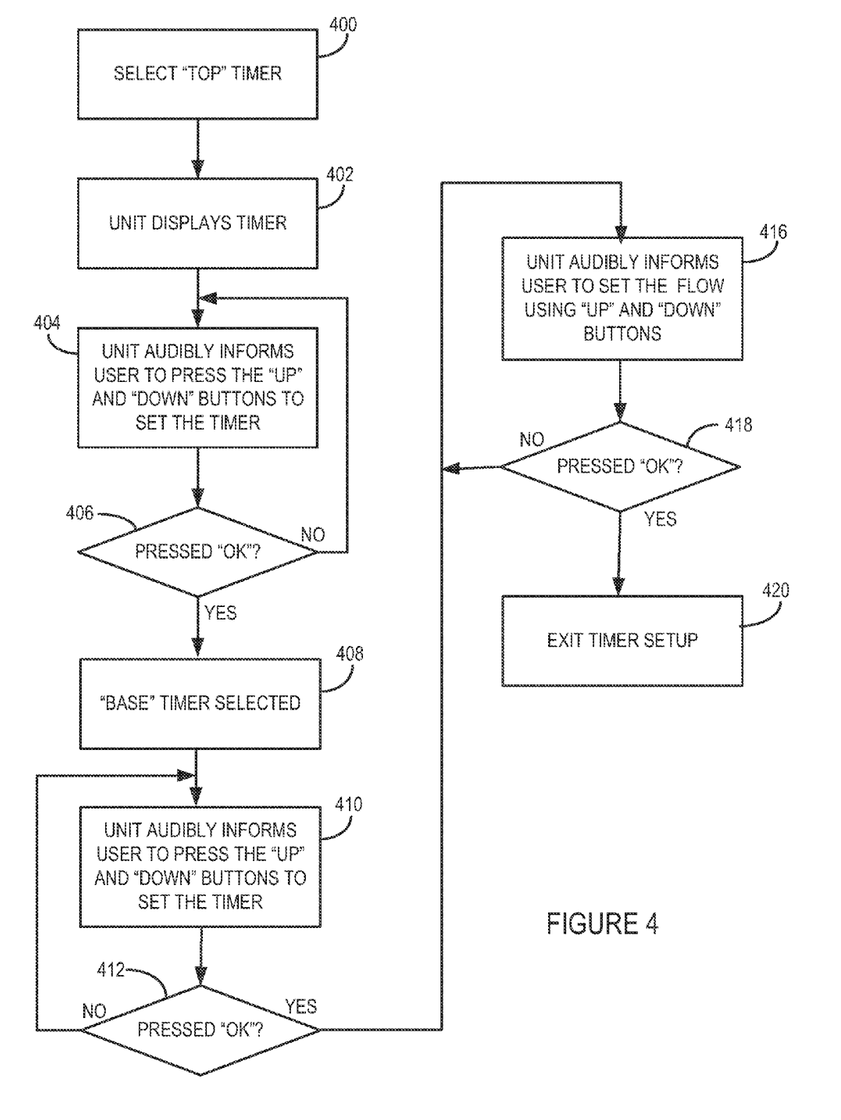
FIG. 4 illustrates a flow chart for a timer and warmer setup operations for the automatic, programmable beverage brewing apparatus consistent with certain embodiments of the invention.

FIG. 4 presents a flow chart for the timer and warmer 111 setup operations for the brewing apparatus. Upon completion of the brew operation setup the CPU 100 will provide the user with the option of setting up desired timer values for the warmers 111 provided by the brewing apparatus to keep the brewed beverage warm after the completion of a brewing operation. In this exemplary embodiment, warmers 111, such as, a top warmer (i.e., warmer plate 1 112) and a bottom warmer (i.e., warmer plate 2 114), are provided for the user. Each warmer 111 has an associated timer that may be set to turn off after a particular set time period to enable the brewing apparatus to keep the brewed beverage warm, but also attempt to keep a carafe sitting upon one of the warmers 111 from boiling dry and harming the carafe or the brewing apparatus. At 400, the CPU 100 displays a message on the display panel 200 indicating that the user may select the "TOP" warmer 112. Upon pressing the "TOP" button 216, the CPU 100 displays the timer associated with the "TOP" button 216 at 402. The timer display is preferably presented to the user in an HH:MM format to allow the user to input a time in hours and minutes for the operation of the Top warmer 112. At 404, the CPU 100 activates the speech circuit 120 to audibly inform the user to "Press the UP or Down keys to set Top Warmer timer, when finished, press OK" or a similar variation thereof.

The CPU 100 enters a wait state at 406 to await the signal from the "OK" button 220 indicating that the user has used the Up and Down keys 216 and/or 218 respectively, to set the timer to their liking. At 408, the CPU 100 preferably displays a message on the display panel 200 indicating that the user may select the "BOTTOM" warmer 114. Upon pressing the "BOTTOM" button 218, the CPU 100 displays the timer associated with the "BOTTOM" button 218 at 410. The timer display is preferably presented to the user in an HH:MM format and provide for input in the same manner as the timer associated with the Top warmer 112. At 412, the CPU 100 activates the speech circuit 120 to audibly inform the user to "Press the UP or Down keys to set Base Warmer timer, when finished, press OK." The CPU 100 enters a wait state at 414 to await the signal from the "OK" button indicating that the user has used the Up and Down keys 216 and/or 218 respectively, to set the base timer to their liking.

At 416, upon completion of the setting of the warmer timers, the CPU 100 audibly informs the user to "Press the up or Down keys to set flow, when finished, press OK" or a similar variation thereof. A user may choose to set the flow function to make small adjustments in the amount of water that flows into the carafe. If a brew operation has overfilled or under filled a carafe in a previous operation, the user can adjust the amount of water used in a brew operation to add or subtract small amounts using a set flow option to keep the carafe from over filling or under filling. The CPU 100 enters a wait state at 418 to await the signal from the "OK" button 220 indicating that the user has used the Up and Down keys 216 and/or 218 respectively, to set the flow to their liking. The CPU 100 then proceeds to exit the timer setup, saving the entered data and ending the setup operations. With setup complete, the CPU 100 places the brewing apparatus in a condition to begin brew operations.

Figure 5:
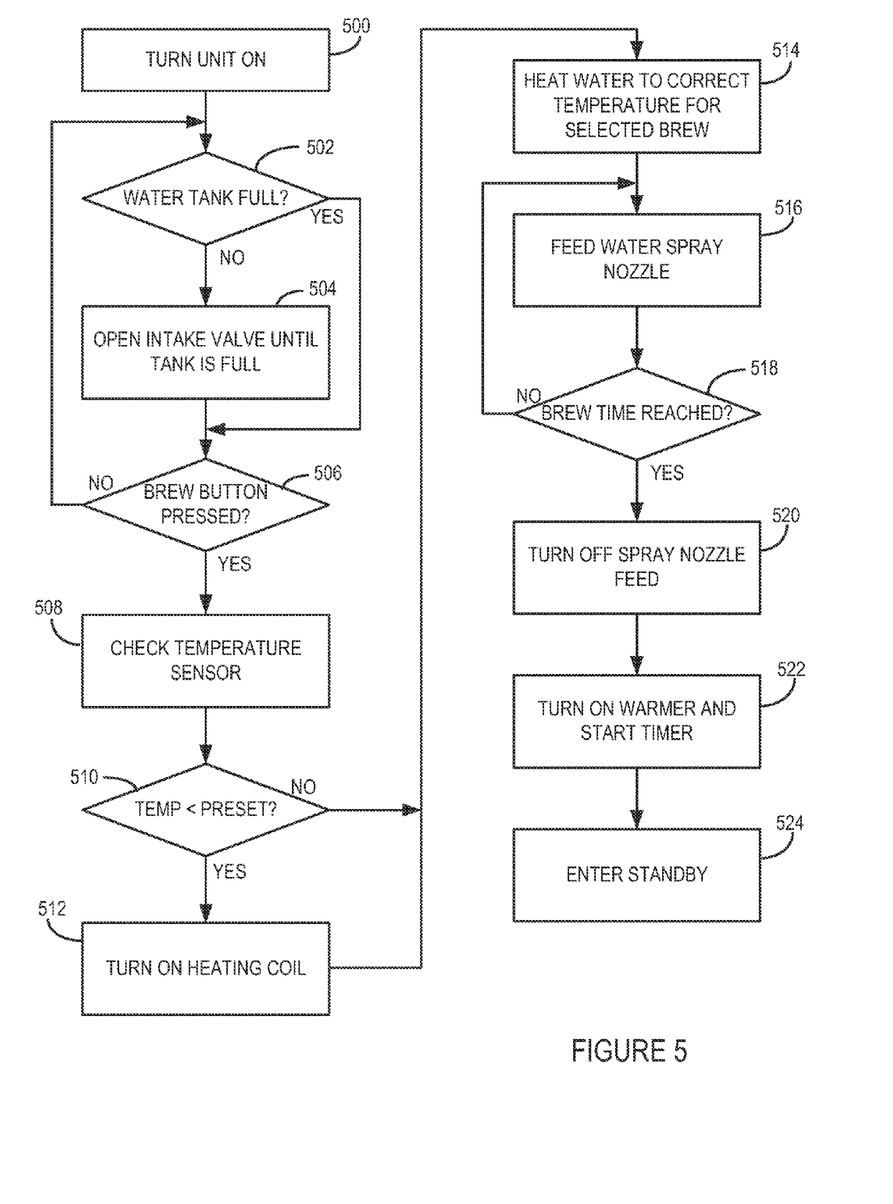
FIG. 5 illustrates a flow chart for a normal operation for the automatic, programmable beverage brewing apparatus consistent with certain embodiments of the invention.

FIG. 5 presents a flow chart for an example operation for the beverage brewing apparatus. In this exemplary embodiment, a brewing operation may be initiated at 500 by turning the beverage brewing apparatus on, for example, by switching on the power to the beverage brewing apparatus. Upon startup the CPU 100 interrogates a sensor in the water tank, i.e., full sensor 102, to determine if the water tank is full at 502. If the full sensor 102 indicates that the water tank is not full, the CPU 100 sends a signal to the intake valve 110 at 504 to open and allow water to flow into the water tank until the full sensor 102 indicates that the water tank is full. If the water tank is full, at 506 the CPU 100 interrogates the brew buttons 205 to determine if a brew button 205 has been pressed and, if so, which one. Additionally, in this exemplary embodiment a brew button 205 may be pressed at any time to begin the brewing process. If no brew button 205 has been pressed the CPU 100 will enter a wait state until a brew button 205 has been pressed to initiate the brewing process. Upon the selection of a brew button 205 the CPU 100 interrogates the temperature sensor 104 at 508 to check the temperature of the water in the water tank. At 510, if the temperature of the water in the water tank is less than the preset water temperature entered by the user in a setup operation, as described above, the CPU 100 sends a command signal to the heating coil 106 in the water tank to turn the heating coil 106 on at 512. The heating coil 106 then heats the water to the correct temperature for the selected brew at 514 under the control of the CPU 100. If the water temperature in the water tank is at or above the preset water temperature for the brewing action, the CPU 100 accepts the water temperature as meeting the temperature necessary for the selected brew. The CPU 100 then sends a command signal to the output valve 116 at 516 to feed water to the spray nozzle 118 in the correct amount for the preset brew time period for the selected beverage to be brewed. The CPU 100 checks the brew time at 518 to determine if the brew time has been reached. If the brew time has not been reached, the CPU 100 continues to signal to feed water to the spray nozzle 118 until the present time period has expired. If the preset brew time has expired, the CPU 100 sends a signal to stop feeding water to the spray nozzle 118 at 520 and turns off the output valve 116. The CPU 100 sends a signal to the warmer 111 selected during the setup operation to turn on the selected warmer 111 and start the timer for the time period selected for the warmer 111 at 522. With the selected brew operation complete, the CPU 100 places the beverage brewing apparatus into a standby mode while continuing to monitor the timer associated with the selected warmer 111 at 524. The CPU 100 will send a signal to turn the selected warmer 111 off when the time period set for the warmer 111 has expired. The beverage brewing apparatus then remains in a standby mode until a user once again initiates either a setup operation or a brewing operation.

6 CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

We claim:

1. An apparatus for interactive programming of a beverage brewing device, comprising:
   a microprocessor configured to activate setup and control of the apparatus upon command by a user;
   a user interface comprising a visual display and one or more trigger components that interact with the microprocessor;
   an electronic storage element associated with the microprocessor for storage of commands and instructions;
   one or more sets of verbal step by step programming and/or use instructions stored in the electronic storage element;
   a verbal speech element in communication with the microprocessor, wherein upon activation of one or more of the one or more trigger components the microprocessor causes the verbal speech element to provide a verbal signal to verbally and audibly announce corresponding step by step programming and/or use instructions stored in the electronic storage element, wherein the stored corresponding step by step programming and/or use instructions comprise verbal instructions in spoken English and/or other spoken language instructing a user step by step through a setup process and/or brewing operation; and
   one or more containers for capturing a brewed beverage dispensed from one or more spray nozzles of the apparatus.

2. The apparatus of claim 1, where the one or more trigger components comprise input components comprising one or more of one or more buttons, switches, dials, and/or a touchscreen device.

3. The apparatus of claim 1, where the verbal instructions relate to programming instructions to assist the user in managing temperature and brewing time parameters for different types of beverages.

4. The apparatus of claim 1, where the one or more trigger components stored on the storage element comprise one or more brew options.

5. The apparatus of claim 1, where the verbal speech element further comprises a speech circuit capable of generating and/or storing verbal instructions in spoken English and/or other spoken language, and communicatively connected to a speaker.

6. The apparatus of claim 1, where the user interface further comprises a speaker.

7. The apparatus of claim 1, where the visual display comprises an LCD display.

8. The apparatus of claim 1, further comprising a network communication connection between the microprocessor and a network through Bluetooth, Wifi, or other communication technology.

9. The apparatus of claim 8, where the storage element associated with the microprocessor accepts and stores brewing options and instructions and/or information for a plurality of beverages from a remote device.

10. The apparatus of claim 1, further comprising one or more timers and one or more warmers, and wherein the verbal announcements further comprise verbal instructions in spoken English and/or other spoken language for programming one or more of the one or more timers and warmers, and for managing a level of water in the one or more associated containers to avoid over or under filling the one or more associated containers.

11. A system for interactive programming of a beverage brewing device, comprising:
   one or more of one or more sensors, one or more heating coils, one or more water valves, one or more spray nozzles; and
   one or more warming plates;
   a user interface comprising a visual display, one or more trigger components, and a speaker;
   a microprocessor configured to manage setup and control of a beverage brewing apparatus through taking one or more input signals received from the one or more sensors and/or one or more trigger components, and sending one or more output signals to an appropriate one of the one or more heating coils, one or more water valves, one or more warming plates, one or more spray nozzles, and/or one or more audio and visual user displays;
   an electronic storage element associated with the microprocessor for storage of commands and instructions;
   one or more sets of verbal step by step programming and/or use instructions stored in the electronic storage element; and
   a verbal speech element in communication with the microprocessor, wherein upon activation of one or more of the one or more trigger components the microprocessor causes the verbal speech element to provide a verbal signal to verbally and audibly announce corresponding step by step programming and/or use instructions stored in the electronic storage element, wherein the stored corresponding step by step programming and/or use instructions comprise verbal instructions in spoken English and/or other spoken language instructing a user step by step through a setup process and/or brewing operation; and one or more containers for capturing a brewed beverage dispensed from the one or more spray nozzles.

12. The system of claim 11, where the one or more trigger components comprise input components comprising one or more of one or more buttons, switches, dials, and/or a touch-screen device.

13. The system of claim 11, where the verbal instructions relate to programming instructions to assist the user in managing temperature and brewing time parameters for different types of beverages.

14. The system of claim 11, where the one or more trigger components stored on the storage element comprise one or more brew options.

15. The system of claim 11, where the verbal speech element further comprises a speech circuit capable of generating and/or storing verbal instructions in spoken English and/or other spoken language, and communicatively connected to a speaker.

16. The system of claim 11, further comprising a network capable communication connection between the microprocessor and a network through Bluetooth, Wifi, or other communication technology.

17. The system of claim 16, where the storage element associated with the microprocessor accepts and stores brewing options and instructions for a plurality of beverages from a remote device.

18. The system of claim 11, further comprising one or more timers, and wherein the verbal announcements from the verbal speech element further comprise verbal instructions for programming the one or more timers, the one or more warmers, and managing a level of water in the one or more associated containers to avoid over or under filling the one or more associated containers.

19. The apparatus of claim 1, further comprising one or more warming plates electrical connected to the microprocessor, wherein the one or more warming plates are configured to maintain the temperature of a brewed beverage dispensed into the one or more containers at a desired temperature.

20. The system of claim 11, wherein the one or more warming plates are configured to maintain the temperature of a brewed beverage dispensed into the one or more containers at a desired temperature.

21. The apparatus of claim 2, wherein the verbal speech element provides step by step instructions in spoken English and/or other spoken language instructing the user which element on the touch-screen device to select to set specific set-up parameters.

22. The apparatus of claim 1, wherein the verbal speech element provides step by step instructions in spoken English and/or other spoken language verbally instructing the user how to set up the apparatus, using one or more of the one or more trigger components, for different grind parameters, specific water temperature for brewing different types of a beverage, brewing a specific strength of a beverage, different quantities of beverage to accommodate different sizes of containers, and/or to shut off the one or more warming plate after a certain period of time.

23. The system of claim 11, wherein the verbal speech element provides step by step instructions in spoken English and/or other spoken language verbally instructing the user how to set up the apparatus, using one or more of the one or more trigger components, for different grind parameters, specific water temperature for brewing different types of a beverage, brewing a specific strength of a beverage, different quantities of beverage to accommodate different sizes of containers, and/or to shut off the one or more warming plate after a certain period of time.

24. The apparatus of claim 1, wherein the beverage comprises one of coffee and tea.

25. The apparatus of claim 11, wherein the beverage comprises one of coffee and tea.

26. The apparatus of claim 1, wherein the one or more sets of verbal step by step programming and/or use instructions stored in the electronic storage element comprises verbal instructions for programing one or more flavor characteristics of the brewed beverage.

27. The apparatus of claim 26, wherein the one or more flavor characteristics of the brewed beverage comprises one or more of temperature, strength, grind size, and brewing time.

28. The apparatus of claim 1, wherein the verbally announced corresponding step by step programming and/or use instructions is in response to a user's activation of one or more of the one or more trigger components and verbally instructs the user to take a next step in the setup process and/or brewing operation.

* * * * *